(12) United States Patent
Li et al.

(10) Patent No.: US 9,804,932 B2
(45) Date of Patent: Oct. 31, 2017

(54) METHOD AND DEVICE FOR PROCESSING DATA AND ELECTRONIC APPARATUS

(71) Applicant: SHELL INTERNET (BEIJING) SECURITY TECHNOLOGY CO., LTD., Beijing (CN)

(72) Inventors: Dingpan Li, Beijing (CN); Ming Xu, Beijing (CN); Yong Chen, Beijing (CN)

(73) Assignee: SHELL INTERNET (BEIJING) SECURITY TECHNOLOGY CO., LTD., Beijing (CN)

( * ) Notice: Subject to any disclaimer, the term of this patent is extended or adjusted under 35 U.S.C. 154(b) by 298 days.

(21) Appl. No.: 14/379,171

(22) PCT Filed: Oct. 18, 2013

(86) PCT No.: PCT/CN2013/085434
§ 371 (c)(1),
(2) Date: Aug. 15, 2014

(87) PCT Pub. No.: WO2015/043010
PCT Pub. Date: Apr. 2, 2015

(65) Prior Publication Data
US 2015/0309885 A1    Oct. 29, 2015

(30) Foreign Application Priority Data

Sep. 30, 2013  (CN) .......................... 2013 1 0462344

(51) Int. Cl.
*G06F 7/00*      (2006.01)
*G06F 17/00*     (2006.01)
(Continued)

(52) U.S. Cl.
CPC ...... *G06F 11/1469* (2013.01); *G06F 11/1417* (2013.01); *G06F 21/568* (2013.01); *G06F 21/575* (2013.01); *G06F 2201/80* (2013.01)

(58) Field of Classification Search
CPC ............. G06F 11/1469; G06F 11/1464; G06F 2201/80; G06F 11/1448; G06F 2201/84
(Continued)

(56) References Cited

U.S. PATENT DOCUMENTS

| 6,205,558 | B1 * | 3/2001 | Sobel ................. G06F 11/1435 707/999.202 |
| 2006/0041738 | A1 * | 2/2006 | Lai ...................... G06F 11/1417 713/2 |

(Continued)

FOREIGN PATENT DOCUMENTS

| CN | 101057246   | 10/2007 |
| CN | 101057246 B | 10/2007 |

(Continued)

OTHER PUBLICATIONS

WIPO, International Search Report for PCT/CN2013/085434, dated Apr. 2, 2015.

*Primary Examiner* — Hosain Alam
*Assistant Examiner* — Nicholas Allen
(74) *Attorney, Agent, or Firm* — Hodgson Russ LLP

(57) ABSTRACT

A method and a device for processing data and an electronic apparatus are provided. The method comprises: obtaining recovery data and modification data when original data is modified, wherein the modification data is data obtained after modifying the original data, and the recovery data is data configured to recover at least a part of the modification data to data in the original data; executing one of the recovery data and the modification data; and executing the other one of the recovery data and the modification data when failing to executing one of the recovery data and the modification data. With the present disclosure, the problem that recovering the system or the system files causes the system unable to work normally is solved, and a stability of the system is enhanced. The present disclosure can be used in the solution for computer viruses.

16 Claims, 4 Drawing Sheets

(51) Int. Cl.
*G06F 11/14* (2006.01)
*G06F 21/56* (2013.01)
*G06F 21/57* (2013.01)

(58) Field of Classification Search
USPC .......................................................... 707/674
See application file for complete search history.

(56) References Cited

U.S. PATENT DOCUMENTS

| | | | | |
|---|---|---|---|---|
| 2007/0157013 | A1* | 7/2007 | Park | G06F 9/4406 |
| | | | | 713/1 |
| 2008/0184022 | A1* | 7/2008 | Peacock | G06F 11/1417 |
| | | | | 713/2 |
| 2008/0301424 | A1* | 12/2008 | Barajas | G06F 11/1417 |
| | | | | 713/2 |
| 2010/0205421 | A1* | 8/2010 | Campbell | G06F 11/1417 |
| | | | | 713/2 |
| 2013/0007438 | A1* | 1/2013 | Kim | G06F 9/441 |
| | | | | 713/2 |
| 2014/0059313 | A1* | 2/2014 | Hwang | G06F 11/1435 |
| | | | | 711/162 |
| 2014/0245093 | A1* | 8/2014 | Ma | G06F 11/08 |
| | | | | 714/747 |

FOREIGN PATENT DOCUMENTS

| | | |
|---|---|---|
| CN | 101477484 | 7/2009 |
| CN | 101909087 | 12/2010 |

\* cited by examiner

METHOD AND DEVICE FOR PROCESSING DATA AND ELECTRONIC APPARATUS

FIELD

The present disclosure generally relates to a computer technology field, and more particularly to a method for processing data, a device for processing data and an electronic apparatus.

BACKGROUND

Existing computer terminals can perform various data processing procedures, such as recovering a master boot record (MBR) during a hardware booting, recovering files and data in a disk by an operating system, and recovering functions during application program running.

(I) MBR Recovery

Conventionally, booting the hardware in a computer may comprise following steps. Firstly, the hardware is powered on. Then, POST (Power-on Self-test) codes for initiating, self-testing and booting the system are executed. Then, the MBR is read from sector 0 of the disk to memory address 0000:7c00, and then address 0000:7c00 is jumped to so that a corresponding program is executed during POST. Finally, the MBR looks for a first active partition, loads a booting sector of the first active partition into the memory and executes the booting sector, so as to boot the operating system, in which the booting sector includes startup codes for booting the operating system.

It can be seen from the above procedures that, MBR plays an important role during the booting. MBR includes two parts, a first part of which is a small piece of program and configured to look for the active partition, and a second part of which is a partition table. The MBR can be modified by a variety of ways, such as modified manually when the operating system is installed, modified by a multi-program booting management software, modified by a disk partitioning and recovering software, modified by an antivirus software, and modified by a malicious software.

Specifically, taking modifying the MBR by the malicious software as an example, by modifying the MBR, the malicious software will take over the operating system before the operating system is booted, so as to perform illegal operation on the computer. Currently, it is possible to detect by the antivirus software whether the MBR is modified by the malicious software. When the antivirus software detects that the MBR is modified by the malicious software, it will attempt to recover the MBR. Conventionally, the antivirus software generally recovers the MBR according to following steps. Firstly, the original MBR is obtained (for example, obtained by reading a backup file). Then, the current "modified MBR" is obtained. The modified MBR may be obtained after the malicious software modifies the original MBR. Subsequently, the partition table is fetched from the current "modified MBR" and put into the original MBR to form "MBR used for recovery". Finally, the "MBR used for recovery" is written into sector 0 of the disk, so that it is possible to enter the computer system by running the MBR used for recovery after rebooting the computer.

The inventors found that, although the above method for recovering MBR can enable the user to boot the normal operating system so as to enter the system, since there are some risks during the above recovery procedure (for example, whether or not the correct original MBR can be obtained is uncontrollable, whether or not the correct partition table can be fetched is uncontrollable, and the recovery result is uncontrollable), the operating system still may not be booted normally.

Specifically, the risks may include the following. 1) The original MBR modified by a plurality of legal and normal programs may be obtained, but it is unable to obtain the correct original MBR if the original MBR has been modified and infected by the malicious software; thus, it becomes a very dangerous thing to recover the obtained MBR. 2) The partition table is at a fixed location in the MBR by default, which is important information referred by the operating system; if the partition table produces errors, booting the operating system will fail. The MBR generally can be accessed and read. However, since various disk recovering software and antivirus software prevent accessing the MBR or return false MBR, the correct original MBR cannot be obtained due to a certain risk presented during fetching and combining the partition table. The above risks are unpredictable and unavoidable. Once such risks occur, the operating system will be destroyed drastically.

(II) File Recovery

The file system in the computer is a system used for organizing files and data, which is generally established in the disk and makes it easier to look for and access data. The operating system itself is composed of files, which are collectively referred to as system files. The system files comprise executable binary files and unexecutable data files. Since the system files will be run and loaded when the operating system boots and runs, it is a common way for the malicious software, viruses and Trojans to modify and replace key system files. Thus, the malicious software, viruses and Trojans can hide themselves by such a way and obtain a chance to run.

When the antivirus software detects that the system files are modified and replaced maliciously, it will attempt to clear the malicious software, i.e., repair or recover the files which are maliciously modified and replaced. If it fails to repair or recover the files which are maliciously modified and replaced, the antivirus software attempts to delete the files so as to eliminate influences of the malicious software on the operating system and user files.

Existing antivirus software repairs or recovers the files which are maliciously modified and replaced as follows. The antivirus software starts to scan the system files and detect whether the files are modified and replaced maliciously, and if yes, the antivirus software begins to repair or recover the system files. During repairing or recovering the system files, it is firstly checked whether the files can be repaired. If the files can be repaired, the repair is executed. If the repair succeeds, the procedure ends. If the files cannot be repaired or the repair fails, the antivirus software attempts to recover the files. During recovering the files, it is firstly checked whether the files can be recovered. If the files can be recovered, the recovery is executed. If the recovery succeeds, the procedure ends. If the files cannot be recovered or the recovery fails, the antivirus software attempts to delete the files. During deleting the files, it is firstly checked whether the files can be deleted. If the files can be deleted, the deletion is executed. If the deletion succeeds, the procedure ends. If the files cannot be deleted or the deletion fails, the antivirus software fails to repair or recover the files and the procedure ends.

The inventors found that there are such risks existing in the above processing procedure. 1) There are risks for repairing the files. The files are generally repaired according to the included database of the antivirus software. However, since the malicious software, viruses and Trojans may vary, it will result in a repair failure. Such a failure is unpredictable. If the modified and replaced files are key files for booting the system, the repair failure will result in a failure of booting the operating system. Such a failure cannot be recovered. 2) There are risks for deleting the files. Similar to the above risk 1), if it fails to repair or recover the files, most of the antivirus softwares will attempt to delete the files. If the modified and replaced files are key files for booting the operating system or key files necessary for normal working of the system, the operating system cannot boot or work normally after the files are deleted. Such a fault is also fatal.

Currently, there is still no effective solution proposed regarding the problem in the conventional technology that the system cannot work normally due to the failure of recovering the system or the system files.

SUMMARY

There is still no effective solution proposed regarding the problem in the conventional technology that the system cannot work normally due to the failure of recovering the system or the system files. Therefore, a main objective of the present disclosure is to provide a method and a device for processing data and an electronic apparatus, so as to solve the above problem.

To achieve the above objective, according to one aspect of the present disclosure, a method for processing data is provided. The method includes: obtaining recovery data and modification data when original data is modified, in which the modification data is data obtained after modifying the original data, and the recovery data is data configured to recover at least a part of the modification data to data in the original data; executing one of the recovery data and the modification data; and executing the other one of the recovery data and the modification data when failing to executing one of the recovery data and the modification data.

Combined with this aspect, in a first possible implementation of this aspect, after obtaining recovery data and modification data, the method further includes: storing the recovery data and the modification data so as to store the recovery data and the modification data in preset storage areas respectively.

Combined with the first possible implementation of this aspect, in a second possible implementation of this aspect, the original data is an original master boot record configured to boot a system, the modification data is a modified master boot record obtained after modifying the original master boot record, and the recovery data is a master boot record used for recovery and is composed of a part of the original boot record and a part of the modified master boot record, in which the part of the modified master boot record comprises a partition table of the modified master boot record.

Combined with the second possible implementation of this aspect, in a third possible implementation of this aspect, storing the recovery data and the modification data includes:

storing the master boot record used for recovery and the modified master boot record in a disk respectively; and storing sector numbers of sectors in the disk which store the master boot record used for recovery and the modified master boot record in a system boot sector respectively.

Combined with the third possible implementation of this aspect, in a fourth possible implementation of this aspect, executing one of the recovery data and the modification data includes:

selecting one of the master boot record used for recovery and the modified master boot record to be executed; and reading and executing the one of the master boot record used for recovery and the modified master boot record according to the sector numbers stored in the system boot sector.

Combined with the fourth possible implementation of this aspect, in a fifth possible implementation of this aspect, before choosing one from the master boot record used for recovery and the modified master boot record, the method further includes:

storing a boot program in the disk, and storing a sector number of a sector storing the boot program in a system boot sector, in which the boot program is configured to provide a user interface, the user interface is configured for a user to select one of the master boot record used for recovery and the modified master boot record, and the boot program is read and executed before the master boot record used for recovery or the modified master boot record;

wherein, selecting one of the master boot record used for recovery and the modified master boot record to be executed comprises:

selecting one of the master boot record used for recovery and the modified master boot record according to a selection input by the user via the user interface.

Combined with the first possible implementation of this aspect, in a sixth possible implementation of this aspect, the original data is an original system file, the modification data is a modified system file obtained after modifying the original system file, and the recovery data is the original system file.

Combined with the sixth possible implementation of this aspect, in a seventh possible implementation of this aspect, storing the recovery data and the modification data includes:

storing the original system file used as the recovery data and the modified system file in a disk respectively; and recording disk paths of the disk for storing the original system file used as the recovery data and the modified system file.

Combined with the seventh possible implementation of this aspect, in an eighth possible implementation of this aspect, executing one of the recovery data and the modification data includes:

selecting one of the original system file used as the recovery data and the modified system file to be executed;

reading the original system file used as the recovery data or the modified system file according to the disk paths recorded; and executing the one of the original system file used as the recovery data and the modified system file.

Combined with the eighth possible implementation of this aspect, in a ninth possible implementation of this aspect, executing the one of the original system file used as the recovery data and the modified system file includes:

reading the original system file used as the recovery data or the modified system file according to the disk paths;

copying the original system file used as the recovery data or the modified system file to a working path of the original system file, in which the working path is a path accessed normally when the original system file works; and running the original system file used as the recovery data or the modified system file in the working path.

Combined with the eighth possible implementation of this aspect, in a tenth possible implementation of this aspect, before executing one of the recovery data and the modification data, the method further includes:

storing the disk paths in a redirect driver, wherein, the redirect driver is configured to redirect a file access path from the working path of the original system file to the disk paths of the original system file used as the recovery data or the modified system file according to the disk paths when the original system file used as the recovery data or the modified system file is accessed, in which the working path is the path accessed normally when the original system file works.

To achieve the above objective, according to another aspect of the present disclosure, a device for processing data is further provided. The device includes: a first obtaining module, configured to obtain recovery data and modification data when original data is modified, wherein the modification data is data obtained after modifying the original data, and the recovery data is data configured to recover at least a part of the modification data to data in the original data; a first processing module, configured to execute one of the recovery data and the modification data; and a second processing module, configured to execute the other one of the recovery data and the modification data when the first processing module fails to execute one of the recovery data and the modification data.

Combined with this aspect, in a first possible implementation of this aspect, the device further includes a second processing module, configured to execute the other one of the recovery data and the modification data when the first processing module fails to execute one of the recovery data and the modification data.

Combined with the first possible implementation of this aspect, in a second possible implementation of this aspect, the original data is an original master boot record configured to boot a system, the modification data is a modified master boot record obtained after modifying the original master boot record, and the recovery data is a master boot record used for recovery and is composed of a part of the original boot record and a part of the modified master boot record, in which the part of the modified master boot record comprises a partition table of the modified master boot record.

Combined with the second possible implementation of this aspect, in a third possible implementation of this aspect, the storage module is configured to store the master boot record used for recovery and the modified master boot record in a disk respectively, and to store sector numbers of sectors in the disk which store the master boot record used for recovery and the modified master boot record in a system boot sector respectively.

Combined with the third possible implementation of this aspect, in a fourth possible implementation of this aspect, the first processing module is configured to select one of the master boot record used for recovery and the modified master boot record to be executed, to read and execute the one of the master boot record used for recovery and the modified master boot record according to the sector numbers stored in the system boot sector.

Combined with the fourth possible implementation of this aspect, in a fifth possible implementation of this aspect, the device further includes:

a storage module, configured to store a boot program in the disk, and to store a sector number of a sector storing the boot program in a system boot sector, wherein, the boot program is configured to provide a user interface, the user interface is configured for a user to select one of the master boot record used for recovery and the modified master boot record, and the boot program is read and executed before the master boot record used for recovery or the modified master boot record;

wherein, the first processing module is configured to select one of the master boot record used for recovery and the modified master boot record according to a selection input by the user via the user interface.

Combined with the first possible implementation of this aspect, in a sixth possible implementation of this aspect, the original data is an original system file, the modification data is a modified system file obtained after modifying the original system file, and the recovery data is the original system file.

Combined with the sixth possible implementation of this aspect, in a seventh possible implementation of this aspect, the storage module is configured to store the original system file used as the recovery data and the modified system file in a disk respectively, and to record disk paths of the disk for storing the original system file used as the recovery data and the modified system file.

Combined with the seventh possible implementation of this aspect, in an eighth possible implementation of this aspect, the first processing module is configured to select one of the original system file used as the recovery data and the modified system file to be executed, to read the original system file used as the recovery data or the modified system file according to the recorded disk paths recorded, and to execute the one of the modified system file and the original system file used as the recovery data.

Combined with the eighth possible implementation of this aspect, in a ninth possible implementation of this aspect, the first processing module is further configured to read the original system file used as the recovery data or the modified system file according to the disk paths, to copy the original system file used as the recovery data or the modified system file to a working path of the original system file, and to run the original system file used as the recovery data or the modified system file in the working path, in which the working path is a path accessed normally when the original system file works.

Combined with the eighth possible implementation of this aspect, in a tenth possible implementation of this aspect, the device further includes:

a storage module, configured to store the disk paths in a redirect driver, wherein the redirect driver is configured to redirect a file access path from the working path of the original system file to the disk path of the original system file used as the recovery data or the modified system file according to the disk path when the original system file used as the recovery data or the modified system file is accessed, in which the working path is a path accessed normally when the original system file works.

To achieve the above objective, according to yet another aspect of the present disclosure, an electronic apparatus is further provided. The electronic apparatus includes: a memory, configured to store recovery data and modification data, wherein the modification data is data obtained after modifying the original data, and the recovery data is data configured to recover at least a part of the modification data to data in the original data; a processor, configured to obtain the recovery data and the modification data; and a display and input device, configured to provide a display interface to a user, and to receive an input of the user, wherein the display interface is configured to display a selection process for the recovery data and the modification data, and the input of the user is used to determine that which one of the recovery data and the modification data is to be executed. The processor is further configured to execute one of the recovery data and the modification data according to the input of the user, and to execute the other one of the recovery data and the modification data when failing to execute the one of the recovery data and the modification data.

With embodiments of the present disclosure, by obtaining the recovery data and the modification data (the modification data is data obtained after modifying the original data, and the recovery data is data configured to recover at least a part of the modification data to data in the original data) when the original data is modified, executing one of the recovery data and the modification data and executing the other one of the recovery data and the modification data when failing to execute one the recovery data and the modification data, the problem that the system cannot work normally due to the failure of recovering the system or the system files is solved, and a stability of the system is enhanced.

BRIEF DESCRIPTION OF THE DRAWINGS

Illustrated drawings herein are used to provide further understanding for the invention and constitute a part of the present disclosure. Schematic embodiments and illustration of the invention are used to explain the invention and do not constitute inappropriate limitation to the invention. In drawings.

DETAILED DESCRIPTION

It should be noted that, embodiments and features thereof in the present disclosure can be combined without confliction. In the following, the present disclosure will be described in detail with reference to drawings and embodiments.

Principles of the present disclosure are shown to be realized in an appropriate computing environment. The following description is based on illustrated embodiments of the invention, and should not be taken as limiting the invention with regard to alternative embodiments that are not explicitly described herein.

First Embodiment

Figure 1:
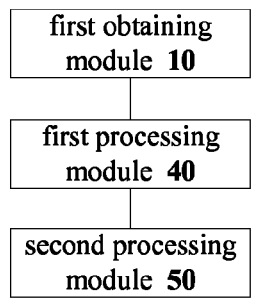
FIG. 1 is a block diagram of a device for processing data according to a first embodiment of the present disclosure.

FIG. 1 shows a schematic diagram of exemplary computer architecture usable for these services. For descriptive purposes, the architecture is only one example of a suitable environment and is not intended to suggest any limitation as to the scope of use or functionality of the invention. Neither should the computing system be interpreted as having any dependency or requirement relating to any one or combination of components illustrated in FIG. 1.

The operating system used in the computing system may be any existing operating system, including the operating system of the fixed service (such as Windows operating system, MAC operating system and Linux operating system) and the operating system of the mobile service (such as Windows mobile phone operating system and iOS). Among all the well-known operating systems, although they may face different scenarios or corresponds to different functional components, they can adopt the method for processing data provided in embodiments of the invention so as to solve the problem that the system cannot work normally due to the failure of recovering the system or the system files.

In its basic configurations, FIG. 1 is a block diagram of a device for processing data according to a first embodiment of the present disclosure. As shown in FIG. 1, the device comprises a first obtaining module 10, a first processing module 40 and a second processing module 50.

The first obtaining module 10 is configured to obtain recovery data and modification data when original data is modified. The modification data is data obtained from modifying the original data. The recovery data may be composed of a part of the original data and/or a part of the modification data, and is configured to recover at least a part of the modification data to data in the original data. The first processing module 40 is configured to execute one of the recovery data and the modification data. The second processing module 50 is configured to execute the other one of the recovery data and the modification data when the first processing module 40 fails to execute one of the recovery data and the modification data.

It should be noted that, the recovery data may be a part of or all of the original data, or a part of the modification data, or a combination of both. For example, the recovery data may include a part of the original data or all of the modification data, or a part of the original data and a part of the modification data.

The above "Executing" includes directly executing and indirectly executing. For example, when the recovery data and/or the modification data is data which can be executed directly (for example, .bat, .dll, .com, and .exe formatted files), it can be executed directly. When the recovery data and/or the modification data is data which cannot be executed directly, it can be executed indirectly by calling and loading other application programs. Moreover, in some cases, "executing" may be described as "using".

When the computer terminal works normally, the original data in the original computer system will be modified to generate the modification data. The modification data may also be the data which is modified by the viruses or the malicious software. In the above embodiment of the present disclosure, the modification data is obtained by the first obtaining module 10. Furthermore, in embodiments of the present disclosure, the computer terminal can generate the recovery data for recovering the system file to another state (for example, a state in which the system file is not modified by the viruses or the malicious software). The recovery data is generally composed of the original data and the modification data. When the computer system uses the recovery data, it may not be booted normally since the recovery data cannot be used normally in the system. In this case, the second processing module 50 can re-execute the recovery data or the modification data that can run normally. Advantageously, the modification data is data that can run normally before recovering the system file in the computer system. Thus, by executing the modification data, the system can at least work normally, thus reducing the risk of data recovery and enhancing the stability of the system.

Advantageously, the device in this embodiment further includes a storage module. The storage module is configured to store the recovery data and the modification data, for example, store the recovery data and the modification data in a preset storage area respectively.

The device for processing data in the first embodiment may be a processor coupled with a memory, in which the processor is configured to execute functions of the first obtaining module 10, the first processing module 40 and the second processing module 50.

Second Embodiment

Figure 2:
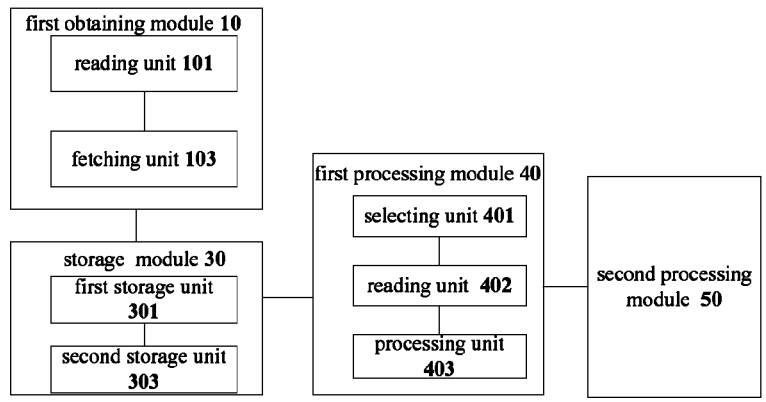
FIG. 2 is a block diagram of a device for processing data according to a second embodiment of the present disclosure.
Figure 3:
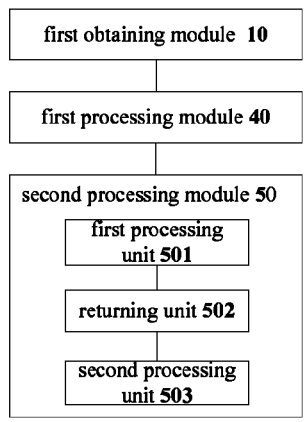
FIG. 3 is a block diagram of a device for processing data according to a fourth embodiment of the present disclosure.

With regard to the device provided in the first embodiment, it can be further illustrated using the embodiment shown in FIG. 2. The following description is made by taking modifying MBR as an example. The second embodiment provides a new method for recovering the MBR, which can avoid the risk that the system cannot run normally by recovering the MBR tentatively (if there is any abnormal condition during recovering the MBR, the recovery is cancelled).

Based on the first embodiment shown in FIG. 1, the original data is the original MBR used to boot the system, the modification data is the modified MBR obtained after modifying the original MBR, and the recovery data is MBR used for recovery and is composed of a part of the original MBR and a part of the modified MBR. The part of the original MBR includes a partition table of the modified MBR, and the partition table is used for the system to read normal partition information.

The involved first obtaining module 10 may include a reading unit 101 and a fetching unit 103. The storage module 30 may include a first storage unit 301 and a second storage unit 303.

The reading unit 101 is configured to read the original MBR and the modified MBR. The fetching unit 103 is configured to fetch the partition table of the modified MBR and to replace the partition table in the original MBR with the fetched partition table, so as to obtain the MBR used for recovery.

The first storage unit 301 is configured to store the MBR used for recovery and the modified MBR in a disk respectively. Locations for storing the MBR used for recovery and the modified MBR are referred to as sector 1 and sector 2 respectively. It should be noted that, there may be one or more disks. In case of a plurality of disks, they are distinguished by different disk numbers. For example, sector 1 is on disk 1, and sector 2 is on disk 2. The second storage unit 303 is configured to store sector number 1 of sector 1 and sector number 2 of sector 2 in a system boot sector respectively. The system boot sector is set to be sector 0 (i.e., the first sector, and the sector is used to boot the system) on the boot disk according to BIOS.

Specifically, in the above second embodiment, the original MBR can be obtained by reading contents in the operating system file (for example, the disk file in disk C). When the original MBR is modified (may be modified when the system works normally or may be modified by the malicious software), the MBR (i.e., the modified MBR in this embodiment) is modified. At this time, when the antivirus software detects that the modified MBR has been modified maliciously by the malicious software, the antivirus software will read the "modified MBR" by the reading unit 101 and fetch the partition list of the "modified MBR" by the fetching unit 103, and then replace the previously obtained partition table in the original MBR with the fetched partition table. Thus, the obtained partition table of the MBR used for recovery is consistent with that of the modified MBR, and other parts of the MBR used for recovery keeps consistent with the original MBR. By such a processing, the system generally can read the correct partition table information when using the MBR for recovery, so as to ensure that the system can read the correct partition information when booting.

In the above embodiment, both sector numbers of sectors for storing the MBR used for recovery and for storing the modified MBR are stored in the system boot sector. Compared with the solution in the conventional technology that only the sector number of the sector for storing the MBR used for recovery is stored, the present embodiment can select to read the sector number of the MBR used for recovery or the sector number of the modified MBR when the system is rebooted, so that the modified MBR can be selected and used when the MBR used for recovery cannot be used normally, and thus the system can be booted normally. In other words, in case that the system cannot be booted normally when using the MBR used for recovery, with the present embodiment, the "modified MBR" can be selected and used when the system is rebooted, so as to ensure that the system can be booted normally.

Advantageously, the first processing module 40 provided in the above first embodiment may include a selecting unit 401, a reading unit 402 and a processing unit 403.

The selecting unit 401 is configured to select one of the MBR used for recovery and the modified MBR to be executed. The reading unit 402 is configured to read one of sector 1 and sector 2 according to the sector number 1 and the sector number 2 stored in the system boot sector. The processing unit 403 is configured to execute one of the MBR used for recovery and the modified MBR so as to go on booting. Taking selecting and executing the modified MBR as an example, the selecting unit 401 reads information of the modified MBR from sector 2 according to the sector number 2 of the modified MBR stored in the system boot sector, and then the processing unit 403 executes the modified MBR to complete the system booting.

The present embodiment may also provide a system which executes (for example, load) the MBR used for recovery or the modified MBR according to a preset rule. In this embodiment, the preset rule is that, the MBR used for recovery is executed firstly when the system is rebooted, and when the system cannot be booted normally when using the MBR used for recovery, the modified MBR is executed during next booting of the system. Advantageously, in case that the system can be booted normally when using the MBR used for recovery, during next booting of the system, the MBR used for recovery is still executed to boot the system. According to the above description, the preset rule is not limited to this, but can be adjusted according to requirements.

The device for processing data in the second embodiment may be a processor coupled with a memory, in which the processor is configured to execute functions of the first obtaining module 10, the storage module 30, the first processing module 40 and the second processing module 50, and can execute corresponding functions of the reading unit 101 and the fetching unit 103 included in the first obtaining module 10, the first storage unit 301 and the second storage unit 303 included in the storage module 30, and the selecting unit 401, the reading unit 402 and the processing unit 403 included in the first processing module 40.

Third Embodiment

Based on the device provided in the above second embodiment, the present disclosure may further provide a third embodiment in which one of the MBR used for recovery and the modified MBR is selected according to a selection input by the user. The third embodiment can be regarded as an improvement to the second embodiment, which can be illustrated and described in combination without confliction. The device in this embodiment further includes a boot program.

The boot program is stored in the disk, and the location for storing it is denoted as sector 3. The sector number 3 of the sector 3 is also stored in the system boot sector. During the booting of the system, the sector number 3 is read before the sector number 1 or sector number 2, and the system loads the boot program from the disk to the memory according to the read sector number 3. The boot program is configured to provide an interface for the user to select one of the MBR used for recovery and the modified MBR.

The solution provided by the above third embodiment provides a new MBR, which stores sector numbers of the "MBR used for recovery", the "modified MBR" and the "boot program". During the system booting, the sectors numbers of the "MBR used for recovery" and the "modified MBR" are provided to the "boot program", so as to provide a function of selecting whether to execute the MBR used for recovery for the user by the "boot program".

Specifically, the boot program provides an interface for the user, so that the user can select buttons on the interface according to requirements, thus selecting to execute the "MBR used for recovery" or the "modified MBR". Thus, during the rebooting procedure of the system, if the user selects to execute the "MBR used for recovery", the "MBR used for recovery" is read from the disk and loaded into the memory according to the sector number of the "MBR used for recovery", and then the "MBR used for recovery" takes control to complete the booting procedure. If the user selects "cancelling recovery" (i.e., selects to execute the "modified MBR"), the "modified MBR" is read from the disk and loaded into the memory according to the sector number of the "modified MBR", and the "modified MBR" in the memory can be rewritten to the system boot sector, and then the "modified MBR" loaded in the memory takes control to complete the booting procedure.

The above solution provides a function of manually selecting recovery or cancelling recovery for the user. Compared with the solution that the system automatically boot the MBR used for recovery or the modified MBR according to the preset rule, the solution in the third embodiment is more flexible.

Advantageously, based on the selection according to the user's requirement, a preset booting rule may also be loaded. For example, when the user selects the "MBR used for recovery", but the system fails to be booted when executing the MBR used for recovery, the preset booting rule can be called. For example, when the system fails to be booted when executing the MBR used for recovery, the operating system reboots and executes the modified MBR to complete the booting procedure, so as to ensure that the system can be booted normally.

Advantageously, if the system can be booted normally after the user selects to execute the "MBR used for recovery", it can prompt the user immediately or during the next system booting to select whether to store the modification. If the user selects to store the modification, the "MBR used for recovery" can be written into the system boot sector directly and the recovery procedure ends successfully. Otherwise, the "modified MBR" is written into the system boot sector and the recovery is cancelled.

The device for processing data in the third embodiment may be a processor coupled with a memory, in which the processor is configured to execute functions of the first obtaining module 10, the storage module 30, the first processing module 40 and the second processing module 50, and can also execute functions of the boot program.

Fourth Embodiment

Using the technical concept of embodiments according to the present disclosure, the fourth embodiment provides a new method for recovering the original hook, which can avoid a lot of risks by recovering the MBR tentatively (if there is any abnormal condition during recovering the original hook, a recovery hook may be used to recover executing the execution function).

In the fourth embodiment, when the original data is an execution function for a caller to call a callee, the modification data is the original hook configured to intercept the execution function, and the recovery data is the hook configured to recover the running of the execution function. In the fourth embodiment, a device for processing hook is provided. The device includes a second obtaining module, a third processing module and a fourth processing module.

The second obtaining module is configured to obtain the original hook and the recovery hook, in which the original hook is the hook configured to intercept the execution function, and the recovery hook is the hook configured to recover the running of the execution function, and the execution function is the function runs when accessing application programs.

The third processing module is coupled with the second obtaining module and configured to execute one of the original hook and the recovery hook.

The fourth processing module is coupled with the third processing module and configured to execute the other one of the original hook and the recovery hook when the third processing module fails to execute one of the original hook and the recovery hook.

The fourth processing module further includes a third processing unit, a returning unit and a fourth processing unit. The third processing unit is configured to execute the recovery hook to call the application program. The returning unit is configured to return the execution result of the recovery hook to the caller when it is determined that the recovery hook succeeds to call the application program. The fourth processing unit is configured to execute the original hook when it is determined that the recovery hook fails to call the application program.

The above embodiment provides a new method for removing the original hook safely. Specifically, for example, when the original hook is the hook made to the program by the malicious software, if the original hook is removed directly, the program may not be able to run normally. In this case, a recovery hook is firstly hooked between the calling function and called function originally hooked by the original hook. After removing the original hook, the calling function calls the called function by the recovery hook. At this time, it is judged whether the calling function can call the called function normally and whether the program can run normally, and if yes, the original hook is removed permanently, and if no, the original hook is recovered to avoid the case that the program cannot run normally. In this case, if the hook is removed directly, the running of the program will be influenced adversely, so other methods are needed to process the program hooked maliciously.

Advantageously, a new hook is installed on the execution function to generate the recovery hook. Thus, after rebooting, the callee (i.e., the called function) can be executed selectively. In other words, after the "caller" initiates the calling, the safe software can call the installed "recovery hook" automatically by default, and the "recovery hook" attempts to call the "callee (i.e., the called function)" directly. If there is not any problem during the execution, the "recovery hook" returns the execution result to the "caller". If there is any problem and abnormal condition, the safe software relocates and calls the "original hook", and at this time, the "original hook" takes back the control. Although the original hook goes on working, it will not affect the normal usage of the existing software system. Using the above device, the abnormal condition that may occur during removing the hook directly may be avoided.

The original hook in the above embodiment may be the hook installed by the malicious software.

The device for processing data in the fourth embodiment may be a processor coupled with a memory, in which the processor is configured to execute functions of the second obtaining module, the third processing module and the fourth processing module, and the fourth processing module also executes functions of the third processing unit, the returning unit and the fourth processing unit.

It should be understood by those skilled in the art, based on the present embodiment and the technical concept thereof, the solution and concept of the fourth embodiment (i.e. the hook technology) can be used to realize other embodiments of the present disclosure. According to the teaching of the present embodiment, it is apparent for those skilled in the art to realize the invention using the hook technology and other technologies, which will not be described in detail herein.

Fifth Embodiment

Figure 4:
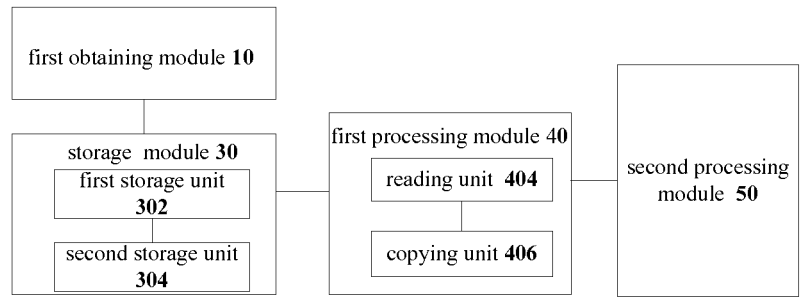
FIG. 4 is a block diagram of a device for processing data according to a fifth embodiment of the present disclosure.

With regard to the device provided in the above first embodiment, it can be further illustrated using the embodiment shown in FIG. 4. The following description is made by taking recovering the system file as an example. The fifth embodiment provides a new method for recovering the system file, which can avoid a lot of risks by recovering the MBR tentatively (if there is any abnormal condition during recovering the system file, the recovery is cancelled).

In the fifth embodiment shown in FIG. 4, the original data is an original system file, and the original system file is the system file that is not modified by other programs when the system is installed. The operating system always backs up the important system file for using when necessary. The modification data is the modified system file obtained after modifying the original system file. During the running of the system, new data will be written into the system file due to actions of other programs so as to obtain the modified system file. In general, the modified system file is legal. However, the malicious software can also modify the system file (for example, add virus codes) to infect the system file. In this embodiment, the recovery data is the original system file. The recovery data may certainly be the system file backup at a certain time when the system uses the system file. In this embodiment, the original system file is taken as an example of the recovery data for illustration, which should not be considered as a limitation to the embodiment.

The involved storage module 30 may include a first storage unit 302 and a second storage unit 304.

Advantageously, the first storage unit 302 is configured to store the original system file and the modified system file in the disk respectively. The second storage unit 304 is configured to record disk paths of the disk for storing the original system file and the modified system file.

Advantageously, the first processing module 40 is configured to select one of the original system file and the modified system file to be used, to read the one of the original system file and the modified system file according to the disk paths recorded in the second storage unit 304, and to use the one of the original system file and the modified system file. Taking selecting the original system file as an example: the disk path of the original system file is path 1, the disk path of the modified system file is path 2, when the application program needs to use the original system file or the modified system file, the original system file is selected to be used, and the original system file is called according to the recorded path 1.

Advantageously, the first processing module 40 may include a reading unit 404 and a copying unit 406. The reading unit 404 is configured to read the original system file or the modified system file according to the disk paths. The copying unit 406 is configured to copy the original system file or the modified system file to a working path of the original system file. The working path of the original system file is a path accessed normally when the original system file works. In this working path, the system file can be called normally by the application program and can be executed normally.

Advantageously, the device further includes a redirect driver. The redirect driver is configured to redirect a file access path (i.e., the path where the application program calls the system file normally) from the working path of the original system file to the disk path of the original system file or the modified system file according to the disk paths when the original system file or the modified system file is accessed, so as to enable the original system file or the modified system file to be executed.

Advantageously, before repairing the system file, it can be detected whether the original system file can be repaired, and if yes, the original system file is repaired to obtain the repaired system file. At this time, the repaired system file can be used as the recovery data, and the modified system file can be used as the modification data. Similarly, one of the recovery data and the modification data can be selected and used after storing the modification data and the recovery data.

In case that the recovery data is the repaired system file and the modification data is the modified system file, it can be illustrated and described in combination with the above fifth embodiment, which will not be described in detail herein.

The above embodiment of the present disclosure provides a redirect driver for the file access. The redirect driver is located in the kernel of the operating system, and can be realized by the file system filter driver. The main functions of the redirect driver are to monitor the file access of the operating system and to redirect the file access.

It can been seen from the above description that the redirect driver provided in the above fifth embodiment provides a solution which selects to use the modified system file when the currently running original system file or the modified system file causes the system to run abnormally, thus avoiding the problem that the system cannot run normally due to failing to repair the repaired system file or due to using the original system file.

The device for processing data in the fifth embodiment may be a processor coupled with a memory, in which the processor is configured to execute functions of the first obtaining module 10, the storage module 30, the first processing module 40 and the second processing module 50, the storage module 30 further executes functions of the first storage unit 302 and the second storage unit 304, and the first processing module 40 further executes functions of the reading unit 404 and the copying unit 406.

Sixth Embodiment

The embodiment further provides an electronic apparatus. The electronic apparatus can be used to realize the above method for processing data and method for processing the hook, and can include the above device for processing data and/or device for processing the hook. The electronic apparatus includes various user terminals, such as fixed devices or portable intelligent devices.

Figure 5:
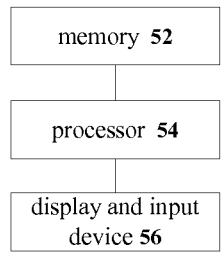
FIG. 5 is a block diagram of an electronic apparatus according to a sixth embodiment of the present disclosure.

FIG. 5 is a block diagram of an electronic apparatus according to a sixth embodiment of the present disclosure. As shown in FIG. 5, the electronic apparatus includes a memory 52, a processor 54, a display and input device 56.

The memory 52 is configured to store recovery data and modification data. The modification data is data obtained after modifying original data, and the recovery data is data configured to recover at least a part of the modification data to data in the original data.

The processor 54 is configured to obtain the recovery data and the modification data.

The display and input device 56 is configured to provide a display interface for a user and to receive an input of the user. The display interface is configured to display a selection process for the recovery data and the modification data, the input of the user is configured to determine which one of the modification data and the recovery data is to be executed.

The processor 54 is further configured to execute one of the recovery data and the modification data according to the input of the user and to execute the other one of the recovery data and the modification data when failing to execute the one of the recovery data and the modification data.

As used in embodiments of the present disclosure, terms such as "module", "component" and "unit" can be referred to software objects or routines executed in the computer system. Although the system and method described herein are advantageously realized in software, it is also possible to realize or conceive them in hardware or in a combination of hardware and software.

Likewise, the principle of the present disclosure may be operated using other general or special computing or communicating environment or configurations. Examples of well-known computing system, environment and configuration suitable for the present disclosure include but are not limited to, personal computers, servers, multiprocessor systems, systems based on micro processing, minicomputers, large computers and distributed computing environment including any of the above systems or devices.

Seventh Embodiment

This embodiment further provides a method for processing data, the corresponding steps and features of which can also be described in combination with modules and features of the above device for processing data and will be omitted herein.

Figure 6:
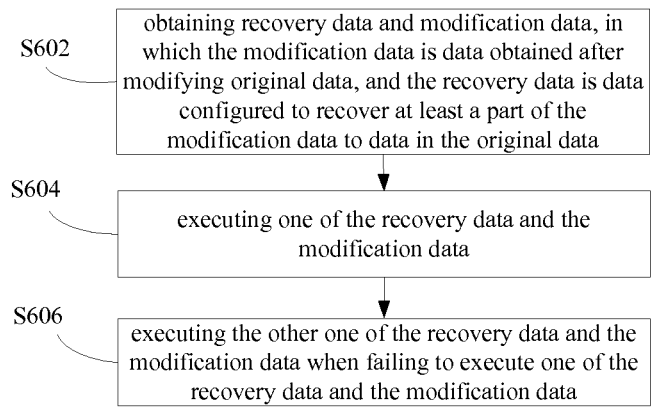
FIG. 6 is a flow chart of a method for processing data according to a seventh embodiment of the present disclosure.

FIG. 6 is a method for processing data according to a seventh embodiment of the present disclosure. As shown in FIG. 6, the method comprises the following steps.

At step 602, recovery data and modification data are obtained. The modification data is data obtained after modifying original data, and the recovery data is data configured to recover at least a part of the modification data to data in the original data.

At step 604, one of the recovery data and the modification data is executed.

At step 606, the other one of the recovery data and the modification data is used when failing to execute one of the recovery data and modification data.

Advantageously, the method further includes: storing the recovery data and the modification data, and storing the recovery data and the modification data in a preset storage area respectively.

Advantageously, the original data is an original master boot record configured to boot a system, the modification data is a modified master boot record obtained after modifying the original master boot record, and the recovery data is a master boot record used for recovery and is composed of a part of the original boot record and a part of the modified master boot record, in which the part of the modified master boot record includes a partition table of the modified master boot record.

Advantageously, storing the recovery data and the modification data includes: storing the master boot record used for recovery and the modified master boot record in a disk respectively; and storing sector numbers of sectors in the disk which store the master boot record used for recovery and the modified master boot record in a system boot sector respectively.

Advantageously, executing one of the recovery data and the modification data includes: selecting one of the master boot record used for recovery and the modified master boot record to be executed; and reading the one of the master boot record used for recovery and the modified master boot record according to the sector numbers stored in the system boot sector; and executing the one of the master boot record used for recovery and the modified master boot record.

Advantageously, before selecting one of the master boot record used for recovery and the modified master boot record, the method further includes: storing a boot program in the disk, and storing a sector number of a sector storing the boot program in a system boot sector, in which the boot program is configured to provide a user interface, the user interface is configured for a user to select one of the master boot record used for recovery and the modified master boot record, and the boot program is read and executed before the master boot record used for recovery or the modified master boot record. Selecting one of the master boot record used for recovery and the modified master boot record to be executed includes: selecting one of the master boot record used for recovery and the modified master boot record according to a selection input by the user via the user interface.

Advantageously, the original data is an original system file, the modification data is a modified system file obtained after modifying the original system file, and the recovery data is the original system file.

Advantageously, storing the recovery data and the modification data includes: storing the original system file and the modified system file in a disk respectively; and recording disk paths of the disk for storing the original system file and the modified system file.

Advantageously, executing one of the recovery data and the modification data includes: selecting one of the original system file and the modified system file to be executed; reading the one of the original system file and the modified system file according to the disk paths recorded; and executing the one of the original system file and the modified system file.

Advantageously, executing the one of the original system file and the modified system file includes: reading the original system file or the modified system file according to the disk paths; copying the original system file or the modified system file to a working path of the original system file, in which the working path is a path accessed normally when the original system file works; and running the original system file or the modified system file in the working path.

Advantageously, before executing one of the recovery data and the modification data, the method further includes: storing the disk paths in a redirect driver, in which the redirect driver is configured to redirect a file access path from the working path of the original system file to the disk path of the original system file or the modified system file according to the disk paths when the original system file or the modified system file is accessed.

Eighth Embodiment

Figure 7:
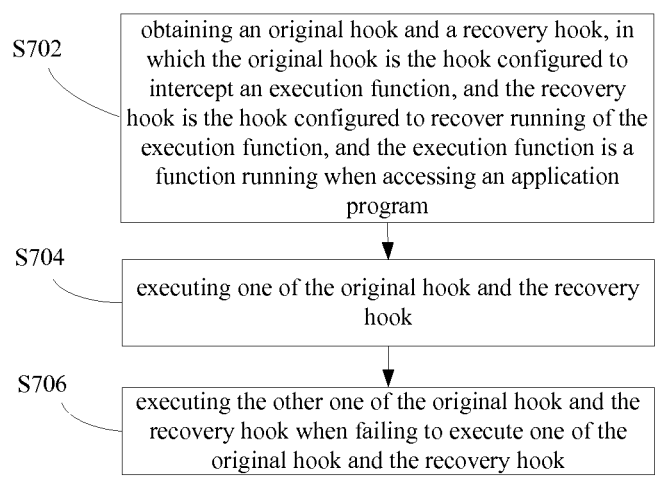
FIG. 7 is a flow chart of a method for processing a hook according to an eighth embodiment of the present disclosure.

This embodiment provides a method for processing a hook. FIG. 7 is a flow chart of a method for processing hook according to an eighth embodiment of the present disclosure. As shown in FIG. 7, the method includes the following steps.

At step 702, an original hook and a recovery hook are obtained. The original hook is hook configured to intercept an execution function, the recovery hook is the hook used for recovery and is configured to recover running of the execution function, and the execution function is a function running when accessing an application program.

At step 704, one of the original hook and the recovery hook is executed.

At step 706, the other one of the original hook and the recovery hook is executed when failing to execute one of the original hook and the recovery hook.

Advantageously, step 706 may include: executing the recovery hook to call the application program; returning an execution result of the recovery hook to a caller when the recovery hook succeeds to call the application program, otherwise, executing the original hook.

Ninth Embodiment

Embodiments of the present disclosure further provide a method for recovering MBR, in which a new MBR and a real mode boot interface program (equivalent to the above boot program) are introduced.

This new MBR has the following features.

1. The new MBR stores sector numbers of the "MBR used for recovery" and the "modified MBR" in existing solutions and the "real mode boot interface program" in the new solution as sector numbers of disk files.

2. The new MBR takes over the boot procedure, reads the "real mode boot interface program" according to the sector number of the "real mode boot interface program" stored in itself, and loads the "real mode boot interface program" to the memory. Moreover, the new MBR transfers the sector numbers of the "MBR used for recovery" and the "modified MBR" to the "real mode boot interface program".

3. The new MBR gives control to the "real mode boot interface program".

The "real mode boot interface program" has the following features.

1. The "real mode boot interface program" provides a simple interface for a user to select the "recovering MBR" or "cancelling recovery".

2. The "real mode boot interface program" reads the selected MBR from the disk according to the selection of the user and according to the sector numbers of the "MBR used for recovery" and the "modified MBR" and loading the selected MBR to the memory.

3. The "real mode boot interface program" gives control to the MBR selected by the user.

Figure 8:
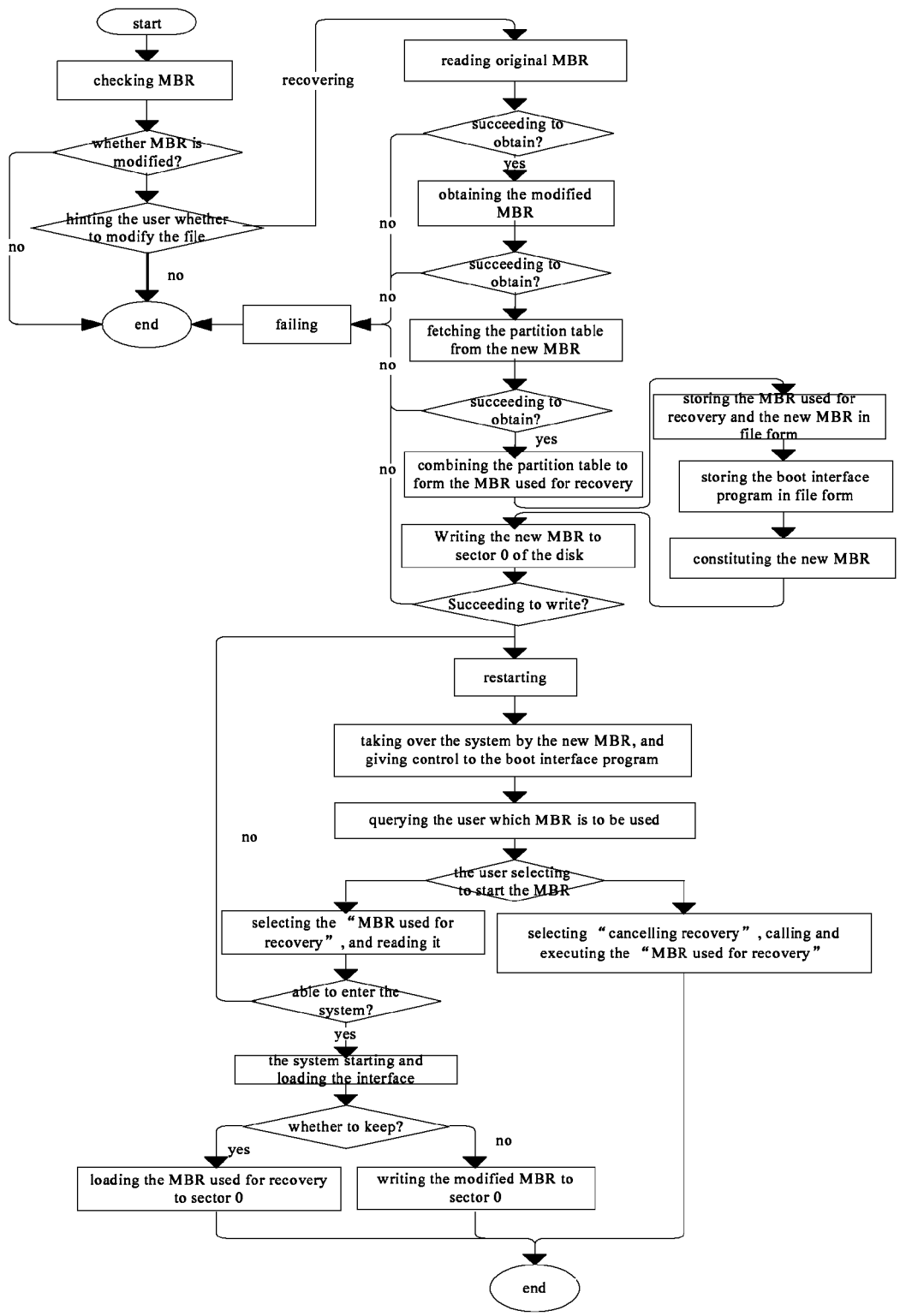
FIG. 8 is a flow chart of a method for recovering MBR according to a ninth embodiment of the present disclosure.

FIG. 8 is a flow chart of a method for recovering MBR according to a ninth embodiment of the present disclosure. As shown in FIG. 8, the method for recovering MBR according to this embodiment includes the following steps.

At step 1, the original MBR is obtained.

At step 2, the current "modified MBR" is obtained.

At step 3, the partition table in the current "modified MBR" is fetched.

At step 4, the partition table is put into the original MBR to form the "MBR used for recovery".

At step 5, the "modified MBR" and the "MBR used for recovery" are written into the disk in file form.

At step 6, the "real mode boot interface program" is written into the disk in file form, and the files are ensured to be continuous in the disk (avoiding file fragmentation).

At step 7, sector numbers of the "modified MBR", the "MBR used for recovery" and the "real mode boot interface program" in the disk are obtained and written into the "new MBR".

At step 8, the "new MBR" is written into sector 0 of the disk.

At step 9, the system is restarted.

At step 10, the "new MBR" obtains control.

At step 11, the "new MBR" reads the "real mode boot interface program" from the disk according to the sector number of the "real mode boot interface program" and loads it to the memory, and gives control to the "real mode boot interface program".

At step 12, the "real mode boot interface program" hints the user to select the "recovering MBR" or "cancelling recovery".

At step 13, when the user selects "recovering MBR", the "real mode boot interface program" reads the "MBR used for recovery" from the disk according to the sector number of the "MBR used for recovery" and loads it to the memory, and gives control to the "MBR used for recovery".

At step 14, when the user selects "cancelling recovery", the "real mode boot interface program" reads the "modified MBR" from the disk according to the sector number of the "modified MBR" and loads it to the memory, rewrites the "modified MBR" in the memory to sector 0 of the disk, and gives control to the "modified MBR" in the memory.

At step 15, when the user boots the system from the "MBR used for recovery" and the system can be booted normally, the system prompts the user to select whether to store the modification, and if yes, the system writes the "MBR used for recovery" to sector 0 directly and the recovery succeeds, otherwise, the system writes the "modified MBR" to sector 0 and the recovery is cancelled.

At step 16, when the user boots the system from the "MBR used for recovery" but the system cannot be booted normally, the system re-executes the above steps from step 9 after the user reboots the system. Herein, the user has a chance to select "cancelling recovery".

Tenth Embodiment

Embodiments of the present disclosure further provide a method for recovering a file, which introduces a new mechanism for avoiding risks caused by file recovery based on the existing solution. In this embodiment, two new modules are introduced, which are a file access redirect driver and a program running monitor.

The file access redirect driver is located in the kernel of the operating system, and is realized by the file system filter driver. The main features of the file access redirect driver are:

1. monitoring accesses to files of the operating system;
2. redirecting the accesses.

The program running monitoring includes monitoring a driving program and an interface, and the main features of which are:

1. monitoring running and finishing of processes;
2. receiving information about the file access redirect driver;
3. querying the user whether to store the modification.

The technical solution according to this embodiment may include the following steps.

At step 1, the system file is scanned to check whether it is modified or replaced.

At step 2, if no, the procedure ends.

At step 3, if yes, it is attempted to repair or recovery the file.

At step 4, it is checked whether the file can be repaired.

At step 5, if yes, the file is repaired. Specifically, the file before repairing is moved to another location, and the file after repairing is put to the location where the file before being moved is located. Moreover, the file paths before moving and after moving are informed to the file access redirect driver.

At step 6, if it succeeds to repair the file, the procedure ends.

At step 7, if the file cannot be repaired or it fails to repair the file, it attempts to recover the file.

At step 8, it is checked whether the file can be recovered.

At step 9, if the file can be recovered, it is recovered. Specifically, the file before recovering is moved to another location, and the file after recovering is put to the location where the file before being moved is located. Moreover, file paths before moving and after moving are informed to the file access redirect driver.

At step 10, if it succeeds to recover the file, the procedure ends.

At step 11, if the file cannot be recovered or it fails to recover the file, it attempts to delete the file.

At step 12, it is checked whether the file can be deleted.

At step 13, if the file can be deleted, the file is deleted. Specifically, the file before deleting is moved to another location, and the location of the file before being moved is informed to the file access redirect driver.

At step 14, if it succeeds to delete the file, the procedure ends.

At step 15, if the file cannot be deleted or it fails to delete the file, the procedure ends.

At step 16, if it succeeds to delete the file and the procedure ends, the file access redirect driver and the program running monitor are informed that the current booting is a tentative booting, and the system is rebooted.

At step 17, when the file access redirect driver monitors that the file which the operating system attempts to access is the modified or replaced file during the tentative booting, it informs the process information (PID, process name) of the accessed file to the program running monitor and informs the program running monitor that the system is attempting to be booted using the file after repairing or recovering.

At step 18, when the program running monitor receives the process information, it begins to monitor the process which accesses the modified or replaced file and checks whether the process ends normally after the process ends. If the process ends normally, the program running monitor monitors the booting of key process of the operating system to determine whether the operating system is booted normally.

At step 19, if the process ends abnormally or the operating system fails to be booted, the program running monitor informs the file access redirect driver that the next booting is a fault booting. The system is rebooted.

At step 20, if the process ends normally and the operating system is booted normally (desired result), the procedure ends.

At step 21, during the fault booting, when the file access redirect driver monitors that the file which the operating system attempts to access is the modified or replaced file, the file access is redirected to the file before repairing, recovering and deleting, and the file access redirect driver informs the program running monitor that the repairing, recovering and deleting operations are needed to be cancelled.

At step 22, when the program running monitor receives that the repairing, recovering and deleting operations are needed to be cancelled, it monitors the booting of the key process of the operating system. After the operating system is booted normally, the program running monitor moves the file moved to another location during repairing, recovering and deleting operations to the original location. The whole operation is cancelled.

In conclusion, according to above embodiments and implementations of the present disclosure, a new method for recovering MBR and a method for recovering a file are provided. With the above embodiments of the present disclosure, a lot of risks caused by recovery failure can be avoided. In other words, it can attempt to recover the MBR and the system file or remove the hook, and also can cancel the recovery by a variety of ways when there is any abnormal condition during the recovery.

It should be noted that, steps shown in flow charts of the drawings can be executed in a computing system including a set of computer executable instructions. Moreover, although logical orders are shown in the flow charts, in some cases, the shown or described steps can be executed in orders different from those described herein.

Obviously, it should be understood for those skilled in the art that, the above modules or steps of the present disclosure can be realized by a general purpose computing device. They can be integrated on a single computing device, or distributed on a network composed of a plurality of computing devices, and optionally, they can be realized by program codes executable by the computing device. Thus, they can be stored in storage devices for executing by the computing device, or they can be made as various integrated circuit modules, or a plurality of modules or steps among them are made as a single integrated circuit module. Thus, the present disclosure is not limited to any particular hardware, software or combination of both.

The above description is only preferred embodiments of the present disclosure and is not used to limit the present disclosure. It should be understood for those skilled in the art that various modification and changes can be made to the present disclosure. Any modification, alternative or improvement made within the spirit and principle of the present disclosure falls in the protection scope of the present disclosure.

What is claimed is:

1. A method for processing data, comprising:
obtaining recovery data and modification data when original data is modified, wherein the modification data is data obtained after modifying the original data, and the recovery data is data configured to recover at least a part of the modification data to data in the original data;

executing one of the recovery data and the modification data; and executing the other one of the recovery data and the modification data when failing to execute one of the recovery data and the modification data;

wherein after obtaining recovery data and modification data, the method further comprises:

storing the recovery data and the modification data so as to store the recovery data and the modification data in preset storage areas respectively;

wherein, the original data is an original master boot record configured to boot a system, the modification data is a modified master boot record obtained after modifying the original master boot record, and the recovery data is a master boot record used for recovery and is composed of a part of the original boot record and a part of the modified master boot record, in which the part of the modified master boot record comprises a partition table of the modified master boot record.

2. The method according to claim 1, wherein storing the recovery data and the modification data comprises: storing the master boot record used for recovery and the modified master boot record in a disk respectively; and storing sector numbers of sectors in the disk which store the master boot record used for recovery and the modified master boot record in a system boot sector respectively.

3. The method according to claim 2, wherein, executing one of the recovery data and the modification data comprises:

selecting one of the master boot record used for recovery and the modified master boot record to be executed; and reading and executing the one of the master boot record used for recovery and the modified master boot record according to the sector numbers stored in the system boot sector.

4. The method according to claim 3, wherein before selecting one of the master boot record used for recovery and the modified master boot record, the method further comprises:

storing a boot program in the disk, and storing a sector number of a sector in the disk which store the boot program in a system boot sector, wherein, the boot program is configured to provide a user interface, the user interface is configured for a user to select one of the master boot record used for recovery and the modified master boot record, and the boot program is read and executed before the master boot record used for recovery or the modified master boot record;

wherein, selecting one of the master boot record used for recovery and the modified master boot record to be executed comprises:

selecting one of the master boot record used for recovery and the modified master boot record according to a selection input by the user via the user interface.

5. The method according to claim 1, wherein the original data is an original system file, the modification data is a modified system file obtained after modifying the original system file, and the recovery data is the original system file.

6. The method according to claim 5, wherein storing the recovery data and the modification data comprises:

storing the original system file used as the recovery data and the modified system file in a disk respectively; and recording disk paths of the disk for storing the original system file used as the recovery data and the modified system file.

7. The method according to claim 6, wherein executing one of the recovery data and the modification data comprises:

selecting one of the original system file used as the recovery data and the modified system file to be executed;

reading the one of the original system file used as the recovery data and the modified system file according to the disk paths recorded; and executing the one of the original system file used as the recovery data and the modified system file.

8. The method according to claim 7, wherein before executing one of the recovery data and the modification data, the method further comprises:

storing the disk paths in a redirect driver, wherein, the redirect driver is configured to redirect a file access path from the working path of the original system file to the disk path of the original system file used as the recovery data or the modified system file according to the disk paths when the original system file used as the recovery data or the modified system file is accessed, in which the working path is the path accessed normally when the original system file works.

9. A device for processing data, comprising:

a first obtaining module, configured to obtain, using a processor, recovery data and modification data when original data is modified, wherein the modification data is data obtained after modifying the original data, and the recovery data is data configured to recover at least a part of the modification data to data in the original data;

a first processing module, configured to execute, using the processor, one of the recovery data and the modification data;

a second processing module, configured to execute, using the processor, the other one of the recovery data and the modification data when the first processing module fails to execute one of the recovery data and the modification data;

wherein after obtaining recovery data and modification data, the method further comprises:

storing the recovery data and the modification data so as to store the recovery data and the modification data in preset storage areas respectively;

wherein, the original data is an original master boot record configured to boot a system, the modification data is a modified master boot record obtained after modifying the original master boot record, and the recovery data is a master boot record used for recovery and is composed of a part of the original boot record and a part of the modified master boot record, in which the part of the modified master boot record comprises a partition table of the modified master boot record.

10. The device according to claim 9, wherein the storage module is configured to store the master boot record used for recovery and the modified master boot record in a disk respectively, and to store sector numbers of sectors in the disk which store the master boot record used for recovery and the modified master boot record in a system boot sector respectively.

11. The device according to claim 10, wherein, the first processing module is configured to select, using the processor, one of the master boot record used for recovery and the modified master boot record to be executed, to read and execute the one of the master boot record used for recovery and the modified master boot record according to the sector numbers stored in the system boot sector.

12. The device according to claim 11, further comprising:
a storage module, configured to store, using the processor, a boot program in the disk, and to store a sector number of a sector storing the boot program in a system boot sector, wherein, the boot program is configured to provide, using the processor, a user interface, the user interface is configured for a user to select one of the master boot record used for recovery and the modified master boot record, and the boot program is read and executed before the master boot record used for recovery or the modified master boot record;
wherein, the first processing module is configured to select, using the processor, one of the master boot record used for recovery and the modified master boot record according to a selection input by the user via the user interface.

13. The device according to claim 9, wherein the original data is an original system file, the modification data is a modified system file obtained after modifying the original system file, and the recovery data is the original system file.

14. The device according to claim 13, wherein the storage module is configured to store, using the processor, the original system file used as the recovery data and the modified system file in a disk respectively, and to record disk paths of the disk for storing the original system file used as the recovery data and the modified system file.

15. The device according to claim 14, wherein the first processing module is configured to select, using the processor, one of the original system file used as the recovery data and the modified system file to be executed, to read the original system file used as the recovery data or the modified system file according to the recorded disk paths recorded, and to execute the one of the modified system file and the original system file used as the recovery data.

16. An electronic apparatus, comprising:
a memory, configured to store recovery data and modification data, wherein the modification data is data obtained after modifying the original data, and the recovery data is data configured to recover at least a part of the modification data to data in the original data;
a processor, configured to obtain the recovery data and the modification data; and
a display and input device, configured to provide a display interface to a user, and to receive an input of the user, wherein the display interface is configured to display a selection process for the recovery data and the modification data, and the input of the user is used to determine which one of the recovery data and the modification data is to be executed,
wherein, the processor is further configured to execute one of the recovery data and the modification data according to the input of the user, and to execute the other one of the recovery data and the modification data when failing to execute the one of the recovery data and the modification data;
wherein after obtaining recovery data and modification data, the method further comprises:
storing the recovery data and the modification data so as to store the recovery data and the modification data in preset storage areas respectively;
wherein, the original data is an original master boot record configured to boot a system, the modification data is a modified master boot record obtained after modifying the original master boot record, and the recovery data is a master boot record used for recovery and is composed of a part of the original boot record and a part of the modified master boot record, in which the part of the modified master boot record comprises a partition table of the modified master boot record.

* * * * *